US007727072B2

(12) United States Patent
Crowder, Jr. et al.

(10) Patent No.: US 7,727,072 B2
(45) **Date of Patent: *Jun. 1, 2010**

(54) SHARED SECONDARY GAME STATION AND SYSTEM

(75) Inventors: Robert William Crowder, Jr., Las Vegas, NV (US); John Francis LaSalvia, Las Vegas, NV (US); Warren Rapelye White, Reno, NV (US); Robert Anthony Luciano, Jr., Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 139 days.

This patent is subject to a terminal disclaimer.

(21) Appl. No.: 11/871,134

(22) Filed: Oct. 11, 2007

(65) Prior Publication Data

US 2008/0032785 A1 Feb. 7, 2008

Related U.S. Application Data

(63) Continuation of application No. 10/077,242, filed on Feb. 14, 2002, now Pat. No. 7,419,425.

(60) Provisional application No. 60/269,668, filed on Feb. 15, 2001.

(51) Int. Cl.
*A63F 9/24* (2006.01)
*A63F 13/00* (2006.01)
*G06F 17/00* (2006.01)
*G06F 19/00* (2006.01)

(52) U.S. Cl. ..................... 463/42; 235/375; 273/143 R; 463/16; 463/17; 463/20; 463/25

(58) Field of Classification Search .................. 463/16, 463/42
See application file for complete search history.

(56) References Cited

U.S. PATENT DOCUMENTS

| | | | | | |
|---|---|---|---|---|---|
| 4,072,930 | A | * | 2/1978 | Lucero et al. | 463/47 |
| 5,080,364 | A | * | 1/1992 | Seidman | 463/17 |
| 5,259,613 | A | * | 11/1993 | Marnell, II | 463/42 |
| 5,265,874 | A | * | 11/1993 | Dickinson et al. | 463/25 |
| 5,580,309 | A | * | 12/1996 | Piechowiak et al. | 463/16 |
| 5,697,844 | A | * | 12/1997 | Von Kohorn | 463/40 |

(Continued)

OTHER PUBLICATIONS

Berk, J.B., Hughson, E., and Vandezande, K., "The Price is Right, But are the Bids? An Investigation of Rational Decision Theory", The American Economic Review, vol. 86, No. 4 (Sep. 1996), pp. 954-970 and www.jstor.org/stable/2118313.*

*Primary Examiner*—John M. Hotaling, II
*Assistant Examiner*—Paul A. D'Agostino
(74) *Attorney, Agent, or Firm*—Andrew B. Chen; Marvin A. Hein

(57) ABSTRACT

A gaming system having a plurality of primary game devices sharing a secondary bonus station is disclosed. The secondary game station comprises a secondary game which is configured to provide play pursuant to a triggering event originating from any one of the primary game devices in the gaming environment. The secondary game station is equipped with controls suitable for playing the secondary game. During play of the secondary game station, the triggering primary game device may also be "locked" so that the player may resume playing the primary game subsequent to playing the secondary game.

6 Claims, 5 Drawing Sheets

U.S. PATENT DOCUMENTS

| | | | | | |
|---|---|---|---|---|---|
| 5,848,932 | A | * | 12/1998 | Adams | 463/20 |
| 6,012,832 | A | * | 1/2000 | Saunders et al. | 235/375 |
| 6,015,344 | A | * | 1/2000 | Kelly et al. | 463/16 |
| 6,033,307 | A | * | 3/2000 | Vancura | 463/20 |
| 6,048,269 | A | * | 4/2000 | Burns et al. | 463/25 |
| 6,110,044 | A | * | 8/2000 | Stern | 463/29 |
| 6,113,098 | A | * | 9/2000 | Adams | 273/143 R |
| 6,165,071 | A | * | 12/2000 | Weiss | 463/24 |
| 6,193,608 | B1 | * | 2/2001 | Walker et al. | 463/25 |
| 6,217,448 | B1 | * | 4/2001 | Olsen | 463/25 |
| 6,224,482 | B1 | * | 5/2001 | Bennett | 463/20 |
| 6,319,125 | B1 | * | 11/2001 | Acres | 463/25 |
| 6,371,852 | B1 | * | 4/2002 | Acres | 463/25 |
| 6,375,567 | B1 | * | 4/2002 | Acres | 463/25 |
| 6,454,648 | B1 | * | 9/2002 | Kelly et al. | 463/16 |
| 6,471,590 | B2 | * | 10/2002 | Saunders | 463/25 |
| 6,511,377 | B1 | * | 1/2003 | Weiss | 463/25 |
| 6,558,256 | B1 | * | 5/2003 | Saunders | 463/25 |
| 6,565,434 | B1 | * | 5/2003 | Acres | 463/25 |
| 6,605,001 | B1 | * | 8/2003 | Tarantino | 463/22 |
| 6,652,380 | B1 | * | 11/2003 | Luciano | 463/25 |
| 6,656,047 | B1 | * | 12/2003 | Tarantino et al. | 463/22 |
| 6,676,515 | B1 | * | 1/2004 | Baltz et al. | 463/25 |
| 6,682,421 | B1 | * | 1/2004 | Rowe et al. | 463/25 |
| 6,685,563 | B1 | * | 2/2004 | Meekins et al. | 463/25 |
| 6,743,098 | B2 | * | 6/2004 | Urie et al. | 463/29 |
| 6,746,330 | B2 | * | 6/2004 | Cannon | 463/25 |
| 6,758,757 | B2 | * | 7/2004 | Luciano et al. | 463/43 |
| 6,811,486 | B1 | * | 11/2004 | Luciano, Jr. | 463/24 |
| 6,852,031 | B1 | * | 2/2005 | Rowe | 463/29 |
| 6,890,258 | B2 | * | 5/2005 | Weiss | 463/25 |
| 7,008,321 | B2 | * | 3/2006 | Rowe et al. | 463/25 |
| 7,037,196 | B2 | * | 5/2006 | Kobayashi et al. | 463/29 |
| 7,134,962 | B2 | * | 11/2006 | Meyerhofer et al. | 463/47 |
| 7,156,738 | B2 | * | 1/2007 | Rowe | 463/25 |
| 7,169,041 | B2 | * | 1/2007 | Tessmer et al. | 463/16 |
| 7,182,690 | B2 | * | 2/2007 | Giobbi et al. | 463/24 |
| 7,247,096 | B2 | * | 7/2007 | Vancura | 463/25 |
| 7,381,132 | B2 | * | 6/2008 | Roberts | 463/17 |
| 7,419,425 | B1 | * | 9/2008 | Crowder et al. | 463/16 |
| 2001/0049303 | A1 | * | 12/2001 | Found et al. | 463/42 |
| 2002/0098888 | A1 | * | 7/2002 | Rowe et al. | 463/39 |
| 2003/0092477 | A1 | * | 5/2003 | Luciano et al. | 463/16 |
| 2003/0228898 | A1 | * | 12/2003 | Rowe | 463/25 |
| 2004/0033831 | A1 | * | 2/2004 | Tarantino | 463/22 |
| 2006/0252512 | A1 | * | 11/2006 | Walker et al. | 463/25 |
| 2008/0090650 | A1 | * | 4/2008 | Tarantino | 463/25 |

* cited by examiner

SHARED SECONDARY GAME STATION AND SYSTEM

CROSS-REFERENCE TO RELATED APPLICATIONS

This application is a continuation of U.S. patent application Ser. No. 10/077,242, filed Feb. 14, 2002 now U.S. Pat. No. 7,419,425, entitled SHARED SECONDARY GAME STATION AND SYSTEM, which is hereby incorporated herein by reference, and which in turn claims the benefit of the filing date of U.S. Provisional Patent Application No. 60/269,668, filed on Feb. 15, 2001 and entitled "SHARED SECONDARY GAME STATION AND SYSTEM", all of which are hereby incorporated herein by referenced in their entirety.

BACKGROUND OF THE INVENTION

1. Field of the Invention

This invention pertains generally to gaming devices as well as amusement games and redemption games. More particularly, the invention is a secondary game which may be shared by two or more primary games. The secondary game (as well as the primary games) may comprise such games as games of chance, skill, perceived skill, combined skill and chance, or other amusement games.

2. The Prior Art

Secondary games are well known, particularly in the field of gaming. A secondary game provides a subsequent-level of play (or plays) pursuant to a Secondary games are well known, particularly in the field of gaming. A secondary game provides a subsequent-level of play (or plays) pursuant to a primary game. Perhaps, the most common form of a secondary game is a "bonus" game or bonus round of play. In the field of gaming, for example, slot machine manufacturers have been known to equip slot machines with a bonus "top-box" game. The bonus game is triggered when a specified event occurs during the play of the slot machine (i.e., the primary game). The triggering event may be a particular win, or the appearance of a symbol or combination of symbols on a wagered payline on the slot machine. Such bonus games provide the player of the slot machine with an added level of excitement and anticipation during play, which in turn generates more play of the slot machine and ultimately more revenue.

Bonus games are also used in other entertainment devices, such as skill-based amusement or arcade games. For example, many video arcade games provide a "bonus round" after the player has achieved a certain level or accomplished a particular goal in the underlying video game. As with the gaming machine described above, bonus levels of play in amusement and arcade games promote player excitement which normally translates to higher play and revenue amounts.

In part due to increased competition, bonus games have become increasingly complex in recent years, particularly in gaming devices. It is not uncommon for a bonus game to incorporate complex lights, sounds, video and/or animation. Some bonus games employ complex electro-mechanical devices, such as rotating wheels, simulated lottery ball dispensers, and even audio-animatronics. Accordingly, the cost of development and production of entertainment games, including games of chance, games of skills, and others have risen.

Some attempts have been made at extending the bonus or secondary play of gaming machines beyond the primary or base game. One example is the "Family Feud Slot™" game implemented at the MGM Grand Hotel and Casino in Las Vegas. In that system, a bonus round of play is provided to players of a plurality of Family Feud base games (e.g., slot and video poker games) when the designated bonus jackpot occurs on the base game. In the bonus round, bonus play video is presented on the player's base game device. A large display is viewable in the general area and serves as an "attract" feature, displaying promotional items to entice players to play the Family Feud games. The player is presented a question randomly selected from the game's database. The top answers are "on the board" and the player's guesses appear on a rotating placard. Hitting the "answer" button on the base machine's button deck makes the selection from among the randomly generated guesses. Then, player sees what the "survey says". The more popular the guess is, the larger the award. The player continues until they guess all the answers or get three strikes. Their awards are totals, and they return to play on the base game. While adding some additional features (e.g., a large display viewable by many other game players for attraction purposes), the Family Feud slot game suffers from the disadvantage, that bonus play or bonus round of play is carried out at the base game terminal. The addition of a large display screen for attracting players to an area adds little to the overall diversity and excitement of the bonus round of play. Furthermore, any controls to play the bonus game must be inherently be present on each of the qualifying base game devices, severely limiting the possibility of game types and game control types suitable for use with the secondary or bonus game.

In addition, most prior art bonus games are typically limited to the genre of the underlying primary game. That is, most skill-based bonus games are pursuant to skill-based primary games. Similarly, most chance-based bonus games are pursuant to chance-based primary games. While suitable in many cases, this tying of bonus game to primary game limits the potential entertainment value of the overall gaming device.

BRIEF DESCRIPTION OF THE INVENTION

To satisfy these and other disadvantages of the prior art, disclosed herein is a secondary game station operable in a gaming environment having a plurality of primary game devices. The secondary game station comprises a secondary game which is configured to provide play pursuant to a triggering event originating from any one of the primary game devices in the gaming environment. In general, the secondary game station is not enabled for play directly by players.

While the present invention may offer secondary play directly from the primary game devices, the present invention is not restricted to secondary play from the primary gaming device. In particular, the invention offers a player the opportunity to play the secondary game (or secondary round of play) at a "secondary game station" which is triggered for play pursuant to a qualifying or triggering event from a primary game device. The secondary game station is equipped with controls suitable for playing the secondary game, and therefore eliminates or otherwise reduces the limitation in the prior art systems where controls for the secondary game are defined by the controls of the primary (base) game device.

The primary game devices may be any gaming device, such as a slot machine, video poker machine, keno machine, video lottery machine and other games of chance. The primary game devices may alternatively be any amusement device such as a video arcade machine, arcade redemption machine, or other games of skill, combined game of skill and chance, game of perceived skill, and other entertainment and redemption games.

The secondary game of the secondary game station may be any game providing a secondary or "bonus" level of play to a player of the primary gaming devices pursuant to a triggering event occurring on the primary game. As such, the secondary game may be a game of chance, a game of skill, a combination game of chance and skill, a game of perceived skill, or other entertainment or amusement game.

The shared secondary game device further includes at least one input device configured to allow the player to play the secondary game. Depending on the particular arrangement between the primary game devices and the shared secondary game device, the input device may be a control to receive direct player inputs or the input device may be a communication device to receive player inputs remotely from a remote device, such as from the primary game device or from a central server in communication with both the primary game devices and the shared secondary game device. As described in further detail below, various arrangements between the primary game devices and the shared secondary game device are contemplated.

The invention contemplates a plurality of uses for the secondary game station and the system environment including, for example, providing "free play" on the secondary game station as a "bonus" of the primary game, providing play at the secondary game station for various awards (e.g., play credits for use on the primary game, prizes, entry into tournaments or drawings), providing play on the secondary game station as a "skill" or "perceived skill" game so that game outcomes of the secondary game affect payout awards, as well as providing competitive play format on the secondary game station for qualifying players of the primary games. These arrangements for the use of the present invention are only illustrative and should not be considered exhaustive.

The present invention also contemplates various means for invoking and/or triggering play of the secondary game station pursuant to the qualifying event on the primary game. As described in further detail below, one preferred method is the use of a voucher or ticket system. Other methods may implement the use of tokens, unique PIN (personal identification numbers) codes, magnetic or smart cards, biometrics, and/or back-end management systems, among others.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

One benefit of the present invention is that a bank of similar gaming machines need only share one bonus device thereby spreading the cost of the bonus device over an entire bank of machines. Another benefit is that the secondary bonus device can be made larger and more sophisticated than existing top box bonus devices currently used in the market.

Further benefits and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
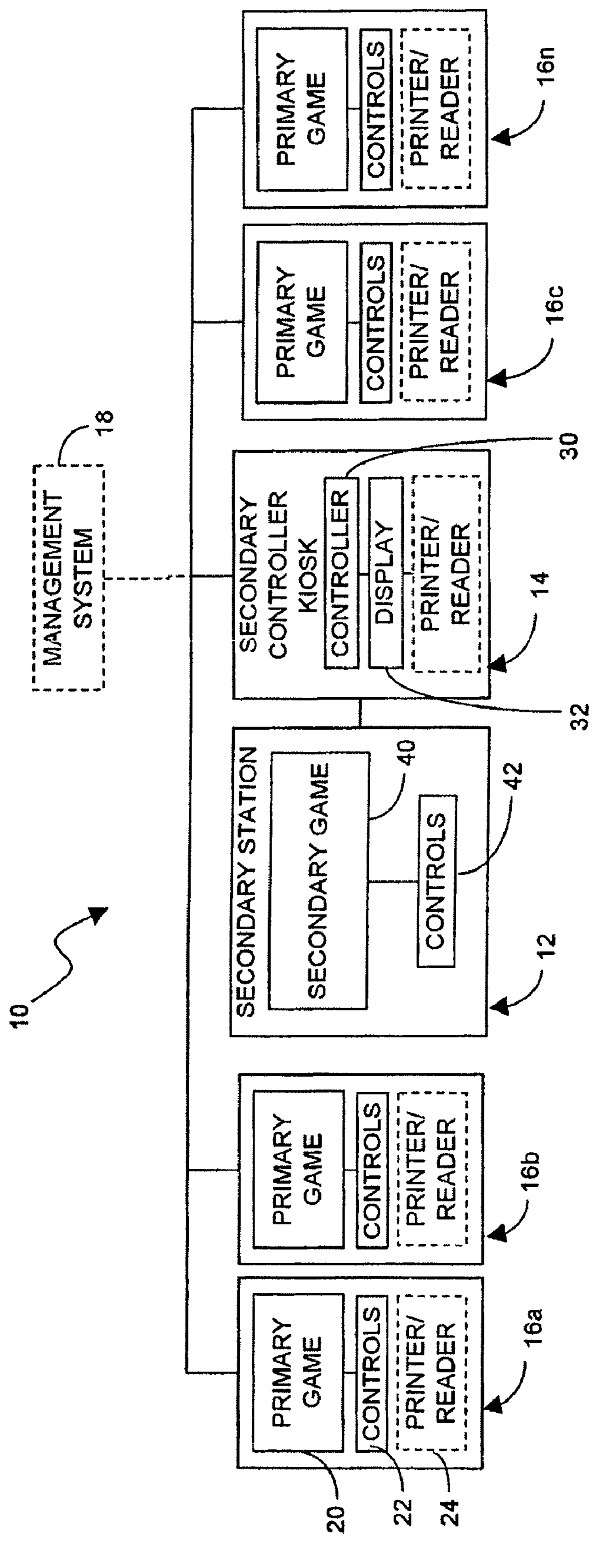
FIG. 1 is a block diagram depicting an example gaming system and secondary game station in accordance with the present invention.
Figure 2:
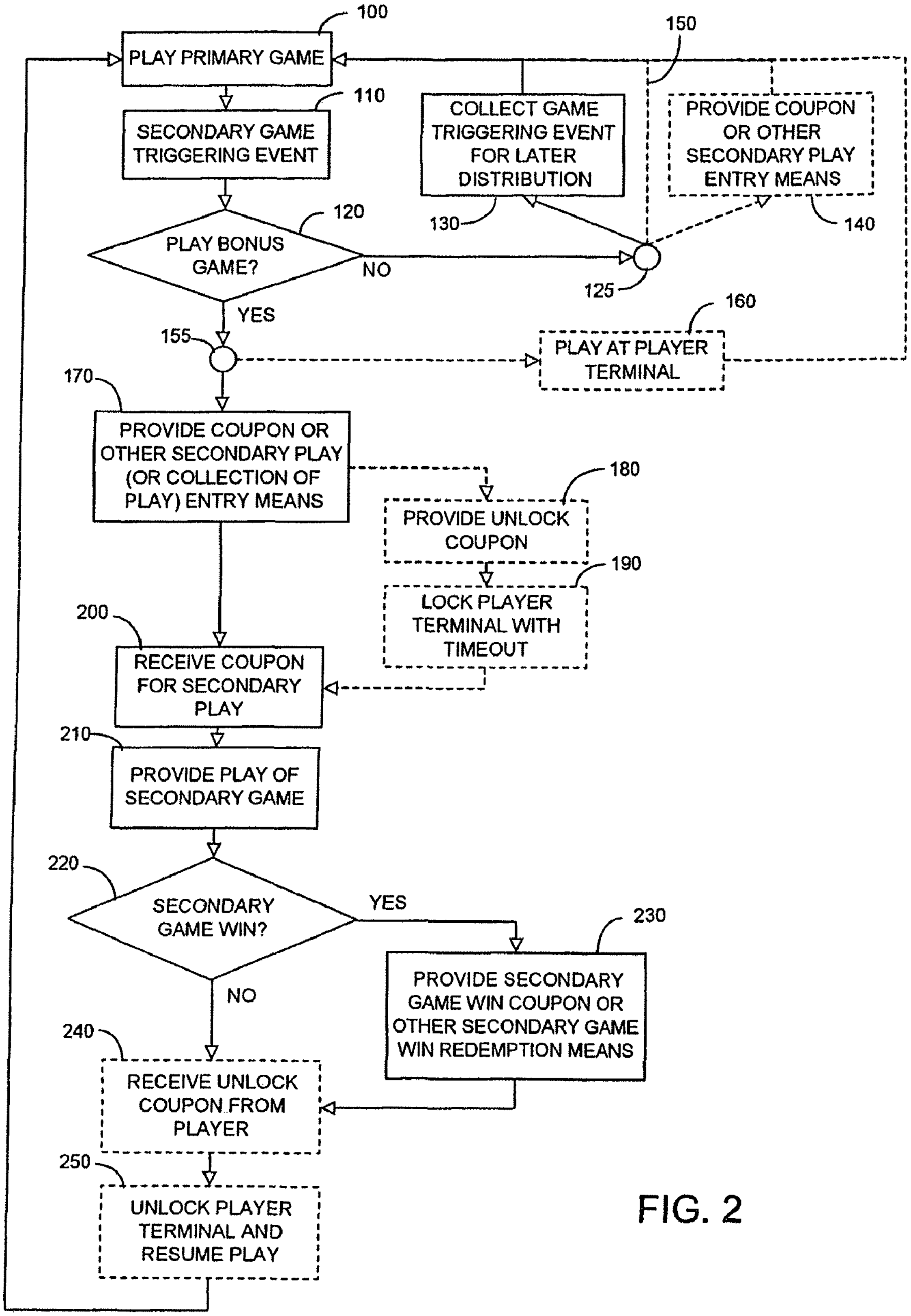
FIG. 2 is a logical flow diagram depicting the general process and usage of the example gaming system of FIG. 1 and in accordance with the present invention.

Referring more specifically to the drawings, for illustrative purposes the present invention is embodied in the apparatus shown FIG. 1 and the method outlined in FIG. 2. It will be appreciated that the apparatus may vary as to configuration and as to details of the parts, and that the method may vary as to details and the order of the acts, without departing from the basic concepts as disclosed herein. The invention is disclosed generally in terms of a secondary gaming device operating in a gaming environment, although numerous other uses for the invention will suggest themselves to persons of ordinary skill in the art.

Referring now to FIG. 1, an example gaming system 10 having a secondary station 12 in communication with a secondary controller kiosk 14. It should be noted that the functions of the secondary station 12 and the secondary controller kiosk 14 may be consolidated into a single device unit. The system 10 further includes a plurality of primary game device **16*a* through 16*n*, each operatively coupled for communication with the secondary controller kiosk 14. A management system 18 may be provided and coupled for communication with the secondary controller kiosk 14**.

Each primary game device **16*a* through 16*n* includes a primary game 20 for play by a player, such as a slot game, video poker game, keno game, or video arcade game. Each primary game device 16*a* through 16*n* also includes controls 22 for controlling game play or otherwise providing game input for primary game 20. Each primary game device 16*a* through 16*n* includes appropriate hardware and software (not shown) for carrying out primary game 20. Since the present invention is application to various fields including gaming, entertainment, amusement, redemption and others, it will be readily apparent to those skilled in the art having the benefit of this disclosure what device requirements are needed to carry out the respective primary game 20**. For example, most video game formats comprise a processor for executing game code, a memory for storage of game data, and input/output devices for communication with a player (e.g., video display, input controls, audio output).

The primary game 20 includes as one of its game events a "triggering" or qualifying event to play a secondary game. The triggering event may be any win, symbol(s) or other designated indicia or event occurring on the primary game 20. Unlike prior art systems which require bonus play to be carried out at the primary game device, the present invention provides the player with the option of playing the secondary or bonus game at a separate game device (i.e., the secondary station 12) as described more fully below.

Each primary game device 16*a* through 16*n* may further comprise a voucher/ticket printer and reader 24. The printer/reader 24 may be used for activating play on the secondary station 12 and for unlocking "locked" primary game devices 16*a* through 16*n* as described more fully below. The printer/reader 24 may have other uses, including providing game credit management and prize redemption, for example. It is noted that the primary game 20 for each of the primary game devices 16*a* through 16*n* need not be the same game, nor be of the same game type.

The secondary controller kiosk 14 is generally coupled for communication with each of the primary game devices 16*a* through 16*n* and the secondary game station 12. For example a wired and/or wireless network structure using ethernet hardware, cabling and communication protocols may be used to network the various devices. The secondary controller kiosk 14 generally carries out the operation of activating secondary play on the secondary station 12 pursuant to triggering (qualifying) events on the primary game devices 16*a* through 16*n*. As noted above, the functions of the secondary station 12 and the secondary controller kiosk 14 may be consolidated into a single device unit.

The secondary controller kiosk 14 includes a controller 30 and a display 32 (such as a video, LCD or touch-screen display). The controller 30 authenticates triggering events on the primary game devices 16*a* through 16*n* to enable play on the secondary game station 12. For example, authentication may involve verifying unique game event transactions against a central database, which may be operated by a management system 18.

The controller 30 also authenticates win events on the secondary game stations 12 for awarding the player appropriately. The controller 30 may be in communication with a management system 18 (having a database (not shown)) for managing the secondary game triggering event transactions as well as secondary game events and transactions (occurring on the secondary game station) and other system-wide services (e.g., game device locking and unlocking, accounting, player tracking, cashless transactions, progressive game transactions, maintenance). In the absence of a management system 18, such transactional and system services may be provided as modules operating within the secondary controller kiosk 14 if so desired.

According to one of the preferred embodiments utilizing a voucher/ticket system, the secondary controller kiosk 14 further comprises a printer/reader 24. The method and use of the printer/reader 24 in accordance with invention is described more fully below.

The secondary game station 12 comprises a secondary game 40 and controls 42 which are suitable for play of secondary game 40. The secondary game 40 may be any game providing a secondary or "bonus" level of play to a player of the primary gaming devices 16*a* through 16*n* pursuant to a triggering event occurring on the primary game 20. As such, the secondary game 40 may be a game of chance, a game of skill, a combination game of chance and skill, a game of perceived skill, or other entertainment or amusement game. According to one embodiment of the present invention, the secondary game 40 is a skill redemption game. For example, the secondary game 40 may provide a building burning in multiple places, wherein the player attempts to extinguish "fires" using a squirt gun control (42). Depending on the level of success by the player to extinguish fires, the player is provided some award level, typically in the form of credits and/or prize(s) or some other award such as an entry into a drawing or tournament, or an indication of the player's "high score." Other skill games may also be implemented, such as basketball, bowling, baseball, skee-ball, archery, and video arcade game, among others.

In other embodiments, the secondary game 40 may be a game of chance, wherein the award is provided according to a pay table corresponding to designated results of the game of chance. One example embodiment would be a large wheel with a plurality of prizes available along the periphery of the wheel, one prize indicated by a payline or other pointer. Pursuant to bonus play, the player is award a chance to spin the wheel to determine the bonus award (i.e., one of the prizes). Examples of such wheels appear on television game shows such as "Wheel of Fortune"™ and "the Price is Righ"™. Similarly, the California Lotery™ provides a similar wheel play for its "Big Spin" game. The above wheel embodiment is only illustrative, and the invention contemplates other games of chance for use with secondary game 40.

In yet other embodiments, the secondary game 40 may be a combined game of skill and game of chance, or a game of perceived skill, where the outcome is random, but from a player's perspective the game concepts appears to introduce an element of skill. The secondary game 40 also may be used in conjunction with a progressive award game, which is described further below.

It is noted that system 10 is only illustrative. Other arrangements of secondary game stations and primary game devices are equally suitable for use according to the invention. For example, the primary games and the secondary station need not be coupled for communication to a secondary controller kiosk where the primary game simply provides play token for use on the secondary game station upon the occurrence of the appropriate triggering event.

The method and operation of invention will be more fully understood with reference to the logical flow diagrams of FIG. 2, as well as FIG. 1. The order of actions as shown in FIG. 2 and described below is only illustrative, and should not be considered limiting.

At block 100, game play begins on one of the primary game devices 16*a* through 16*n*. Normally, a player provides game credits, tokens, currency, accessing an account (e.g., game account, player account, debit account) or some other means for providing game play credits for play on the gaming device. In some cases, game play may be provided without requiring the player to provide game credits. Once the game 20 is initiated for play, the player then plays the primary game 20 in accordance with the game logic of primary game 20.

At block 110, during the course of playing primary game 20, a triggering or qualifying event may occur (such as a particular win, symbol(s) or other designated indicator(s) occurring) to enable a secondary or secondary play. For example, if the primary game 20 is a slot-based game, the triggering event may be the appearance of certain designated symbol(s) appearing on a wagered payline. When a triggering event occurs, decision block 120 is then carried out.

At decision block 120, the player is queried to determine if the player would like to play the secondary (or bonus) play at the present moment. If so, the processing continues to node 155. Otherwise, processing continues to node 125. It should be noted that in some embodiments of the invention, this decision block may be omitted, where for example, the player is required to play the secondary game in which case processing to node 155 from block 110 is carried out without decision block 120.

In the case where the player has elected to not play the secondary game at the moment the corresponding triggering event takes place, processing continues to node 125, where three possible routes are available. In the preferred embodiment, block 130 is carried out, and the secondary triggering event transaction is recorded (and accumulated) or otherwise collected with other secondary triggering events if any. Typically this is data is tracked in a memory or other storage means, such as a central database (e.g., maintained by the management system 18 or the secondary kiosk 14).

Alternatively, as shown in block 140, a coupon, voucher, ticket 500 or other instrument (e.g., token) may be provided to the player to entitle the player play the secondary game 40 at some later time. Absent a tangible instrument, other means may be used to associate the player for later play of the secondary game 40, including, for example, data cards (magnetic and smart cards), or PIN codes utilizing a back-end database or system.

Another alternative as shown in path 150 would be to simply discard the player's entitlement to play the secondary game 40 at some later time. Processing from block 130, 140 or path 150 returns to block 100 for further primary game play.

In the case where the player has elected to play the secondary game at the moment the corresponding triggering event takes place, processing continues to node 155, where two possible routes are available. An alternative embodiment would be to allow the player to simply play the bonus game from the player terminal (i.e., game device) as shown in box 160 after which processing returns to block 110.

In the preferred embodiment, processing continues to block 170. At block 170, in response to the secondary game triggering event, the gaming device provide means for allowing the player to play the secondary game 40 at the secondary game station 12. In one preferred embodiment utilizing ticket printers and readers (24), the player is provided a secondary play coupon 500 (or voucher or ticket) for presentation to the secondary controller kiosk 14. In other embodiments not utilizing a ticket system, other tangible instruments may be used (e.g., data cards, tokens). Absent a tangible instrument, a back-end system may be used in conjunction with other identifying information (e.g. player PIN code) to communicate the entitlement of the player to play the secondary station 12. This transaction is typically recorded in the central database for later verification. Indicated on the ticket 500 may be a description of the type of ticket and the secondary bonus game for which the ticket is issued 501, the time and date the ticket was issued 502, which primary game device the ticket was issued from 503, sequential ticket number issued 504, a unique ticket identifier 505, a machine readable barcode 506 representing the unique ticket identifier 505, the amount of credits or cash 507 the player had when the ticket was issued, and the number of bonus plays 508 this ticket entitles the player to play on the secondary game station. All or some of this information may sent to the management system via the communication link and stored in the management system's database for later retrieval and verification by the secondary station based on the tickets unique identifier 505. In another implementation, the pertinent information may be encoded right into the unique ticket identifier 505. In the case of smart cards being utilized instead of tickets, the pertinent information could be encrypted and stored right inside the smart card.

Optional blocks 180 and 190 may then follow block 170. Otherwise, processing directly follows to block 200 from block 170. Optional block 180 and 190 provide a further enhancement to the system 10 by providing a lockout mechanism of the primary gaming device (used by the player) during the duration the player is playing the secondary game. This feature is particularly important in the gaming field where, for example, a player perceives a particular machine as "hot" (i.e., providing a high level of payout). In such cases, a player may forgo leaving the game device to play the bonus game because another player may take over the machine while the player is away playing the bonus game. The lockout feature provides a means for a player to temporarily lock a machine and later return to resume play. The example steps of blocks 180 and 190 provide an is example method for carrying this lockout feature, although the present invention contemplates other methods.

At block 180, the primary game device issued the player an "unlock coupon" which may later be re-inserted to "unlock" the game device.

At block 190, the player terminal (i.e., primary game device) enters a temporary locked state, wherein primary game play is temporarily suspended and the current state of the primary games is generally maintained (e.g., player's game credits). A predetermined timeout period may be specified so that the gaming device unlocks if the timeout period expires. The timeout period is generally sufficient to allow the player to complete play on the secondary station 12 but expires so that the game player on the gaming device is not unnecessarily suspended (e.g., where the player leaves after player bonus game without returning to the primary game).

An alternative to the lock up feature would be to simply allow the player to "cash out" after receiving the secondary play coupon. Since it is unlikely that players would be willing to leave their credits on a primary game device while playing the secondary game device, the bonus play ticket 500 may combine all of these functions such as entitle secondary bonus play, cash out the player's credits from the primary game device 507, save the primary game state information, and lock the primary game device until the player returns from the secondary game station or a timeout period elapses.

At block 200, the player present the secondary play coupon to the ticket reader of the secondary controller kiosk 14. The ticket is received, read, and the corresponding transaction is normally first verified by the controller against the central database. This is accomplished by reading the barcode on the ticket 506 to get the unique ticket identifier 505. This unique identifier is used to look up and verify the ticket information stored in the database on the management system. This also allows the secondary game station to retrieve information created by the primary game device and stored on the management system which might not be encoded visually on the ticket. For example, the primary station could store how many credits the player will win on the secondary game station without making it readily apparent to the player who receives the game play coupon 500. Once verified processing continues to block 210.

At block 210, the controller 30 activates play on the secondary station 14, allowing the player to play the secondary game 40. The secondary game events and/or results are communicated to the controller 30 for further processing. In response to communication from the secondary game 40, the controller 30 records the transactions associated the secondary game event and/or results.

As noted above, the results of the secondary game 40 may produce the issuance of awards to the player depending on any award arrangements, if any, for system 18. At decision block 220, the controller 30 determine whether a secondary game win was produced entitling the player to some form of award. If so, block 230 is then carried out. Otherwise processing continues to block 240.

At block 230, the player is entitled to some form of "secondary" (or bonus) award based on play of the secondary game 40. The controller 30 will typically record this transaction in the central database for later verification. The controller may then issue the player an instrument (e.g., voucher, ticket, coupon, token) memorializing the player's entitlement to the secondary award. For example, the secondary station may award game credits for use on the primary game devices, or award free game plays on the primary game device, or perhaps award credits for use in redeeming tangible prizes, or perhaps other prizes, such as vacations, tickets to events, entry into events or drawings, or other prize. Absent a tangible instrument to record the secondary award, other means may be used to associate the player with the secondary award, including, for example, data cards (magnetic and smart cards), or PIN codes utilizing a back-end database or system. Block 240 is then carried out.

Optional block 240 and block 250 (like blocks 180 and 190) may be provided to unlock the previously locked player terminal (i.e., primary game device). If the player terminal was not locked (blocks 180 and 190), processing may simply return to block 100.

At block 240, the player presents the "unlock" coupon (from block 180) to the locked gaming device. The reader accepts the "unlock" coupon for processing.

At block 250, the primary game device then verifies the unlock coupon, typically against the central database. Once verified, the player terminal (primary gaming device) is unlocked for play, restoring the game state of the machine to the previous state prior to locking (block 190). Thus the player's game credits are restored, and the player may resume play of the primary game 20 as indicated by the path to block 100.

In the alternative case where the primary game device issued a secondary play coupon which also cashed out the player and locked up the primary game device and stored primary game state information, the secondary game win coupon could be used to unlock the primary game device for play and redeem any winning prize represented by the secondary game win coupon, and restore the game play state information of the primary game device.

The arrangement of the types of primary games and secondary games may be provided according to the needs of the system 10. In some cases, the primary game and secondary game may both comprise games of chance. In other cases, the primary game and secondary game may both be games of skill. In other cases, the types may be mismatched, (i.e., chance primary game and skill secondary game). Many other arrangements are contemplated as noted above. Similarly, the arrangement or logic of any reward/award system for play on the secondary game 40 may be providing according to the needs of the systems 10 as determined by the system operator.

In some embodiments, an award system may be provided pursuant to the result of the secondary game. In other embodiments, the bonus play is simply considered a "free play," and no additional awarded are necessarily issued. In some embodiments, the skill (or perceived skill) of the player may be used to determine the award provided to player. According to yet another embodiment, the secondary game station may allow simultaneous play by a plurality of qualifying players, where the award system may be based on skill, chance, perceived skill, or some combination of skill, chance, or perceived skill.

Perceived Skill Games as Secondary Game Play

Using a skill based game as a secondary game station is desirable for player entertainment; however, in some games, it is desirable to predetermine the outcome of the secondary game. This predetermined outcome for the secondary game may be determined by the primary gaming device or the secondary gaming device. When skill is involved, it is important to keep the player perception that his skill in playing the secondary device does affect the outcome even though the win amount is predetermined. Another benefit is that if the player does not play with optimum skill, using the following method the player will still win the predetermined amount. The following method is just one way of combining skill with predetermined outcomes; however, variations on this basic theme would be apparent to one skilled in the art having the benefit of this disclosure.

In this example there exists a primary game with a fireman theme called 4-alarm-bonus. This game is a 5 reel, 5 payline video slot machine. This game is played by the player until a triggering event occurs which allows the player to play the secondary skill based game. The triggering event might involve lining up 3, 4, or 5 fire hose slot symbols on a payline, for example.

When the triggering event in the primary game occurs, the player is awarded a secondary game coupon that enables one or more plays at the secondary game station. Associated with the coupon (e.g., electronically or directly encoded on the coupon) can be the information regarding the outcome of the secondary game play, the outcome determined by the primary game. Alternatively, the secondary game can determine the outcome upon enablement of play by the secondary controller kiosk.

This secondary game involves a play station where the player's objective is to put out fires burning in building windows by using a water squirt gun connected to the secondary game station. As the player squirts at the fire in each window, the fire light begins to dissipate until it is completely out. This allows the fireman to climb up the ladder to the next floor on the building until those fires are put out by the player. The object of the game is to get the fireman to the top of the building as fast as possible to rescue a lady in distress. As each fire is put out and the fireman advances, the player is awarded points. Different point values may be awarded based on the speed at which each fire is put out and the height of the fire in the building. The player is also awarded an additional point value regarding the speed at which the fireman rescues the lady. These points are used by the secondary game station to select a prize award for the player. This prize award can be made to be equivalent to the predetermine outcome by using the following technique.

Figure 3:
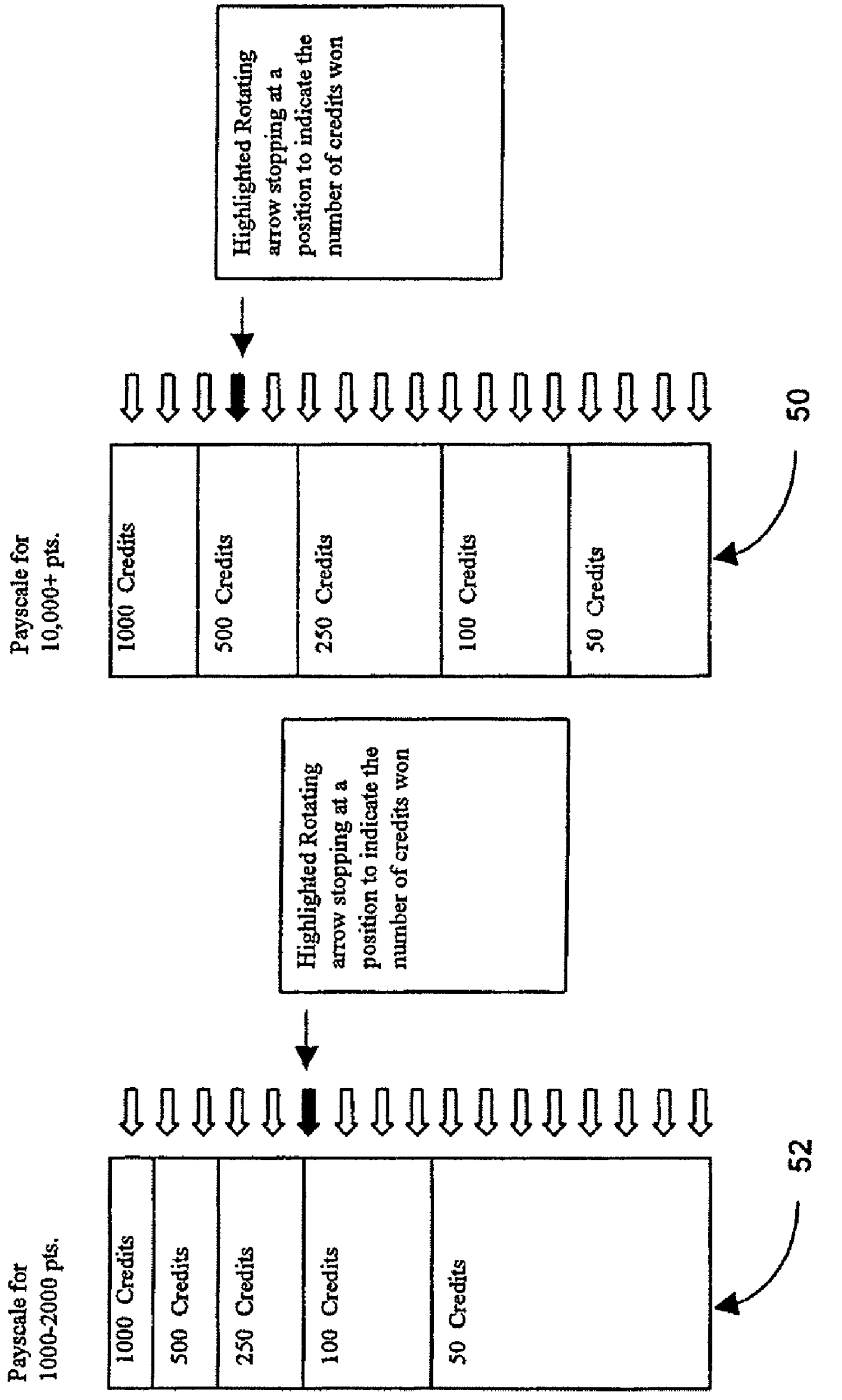
FIG. 3 depicts an example pay scale for a perceived skill game in accordance with the present invention.

Once the coupon is inserted into the secondary station, the player will begin playing the skill based game. Player "obstacles" in the skill based game can be designed based on the predetermined outcome of the game. If the outcome of the game is predetermined to win a small number of credits such as 100, more difficult obstacles can be presented throughout game play causing the player to take longer to rescue the subject and thus getting less points. If the predetermined outcome is to win a large amount of credits such as 1000, easier fires to put out might be presented so that the fireman can quickly rescue the subject thus awarding the play a higher number of points for the rescue. The secondary game will be designed so that the player playing with medium skill can be awarded a point value representative of their predetermined outcome; however sometimes the player's actual awarded points may be much higher or lower based on skill. The secondary game then uses the players' points' value to dynamically create or pick a payscale. The play station appears to randomly select a value within the payscale which will be equivalent to the predetermined outcome of the secondary game prior to play. An example payscale for two different point values achieved by the player is depicted in FIG. 3.

In the payscale 50 on the right, the player achieved more points in the secondary skill based game therefore, the player perceives that there is a better opportunity for the bonus game to select a higher win amount. An additional apparent skill factor can be introduced by quickly rotating the highlighted arrows so fast that it is difficult to accurately track, and allowing the player to stop the arrow by pressing a stop button; however, the arrow will always stop in the range that is equal to the predetermined outcome of the secondary game.

The benefit of this method is that any player regardless of skill can still win 1000 credits they were predetermined to win. In this case the player might be presented a low payscale because of poor skill factor but perceive that they were lucky because they stopped the arrow on the 1000 credit section of the payscale. In the case of the highest skilled player who is predetermined to win only 50 credits, obstacles will be thrown in their way in the skill game to keep the point value relatively low so that the highlighted arrow will fall in the 50 credit section. By balancing obstacles, points, payscales, and highlighted arrow stoppage, the player perceives that skill is a factor and the game is not predetermining the outcome.

Perceived Skill Games as Progressive Secondary Game

Figure 4:
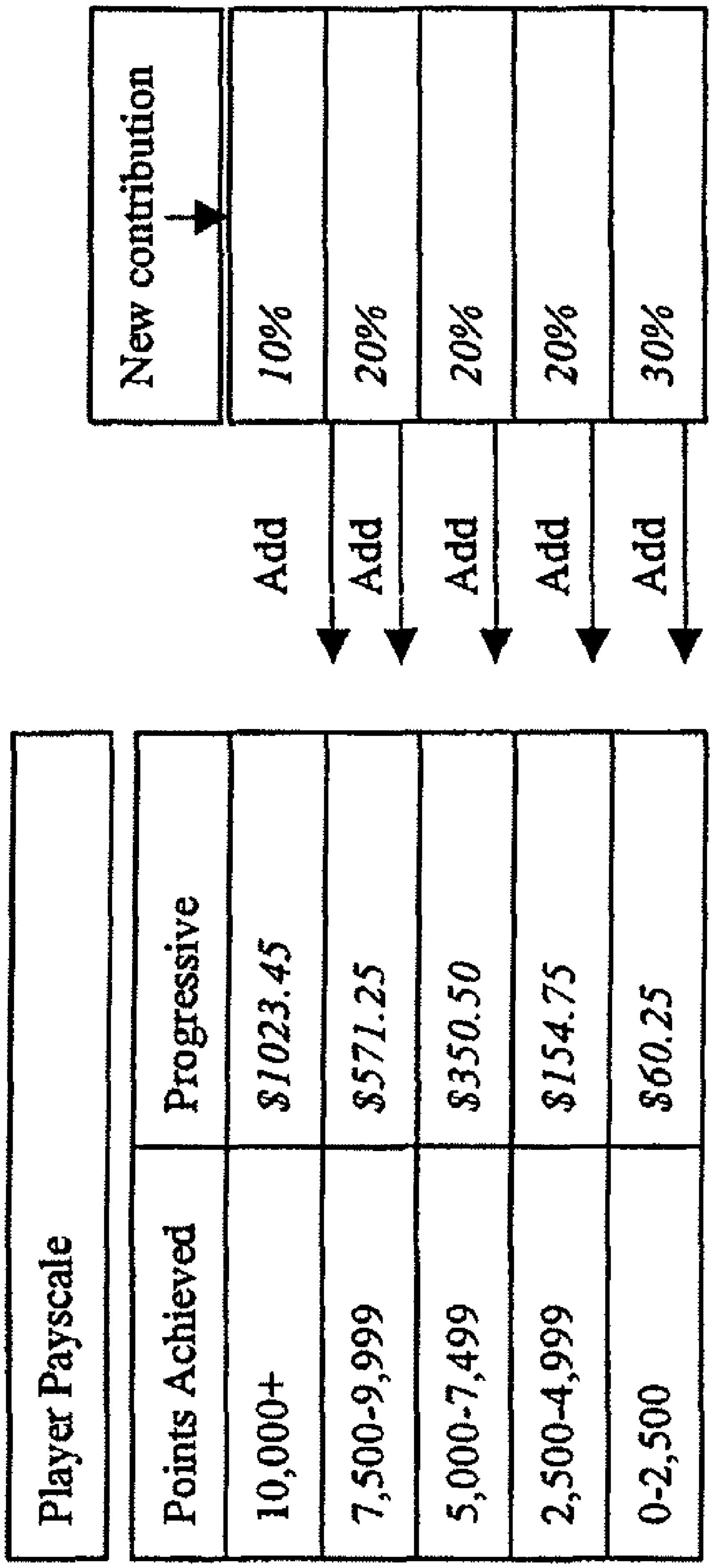
FIG. 4 depicts an example contribution schedule where a percentage of contributions funds progressive prizes.
Figure 5:
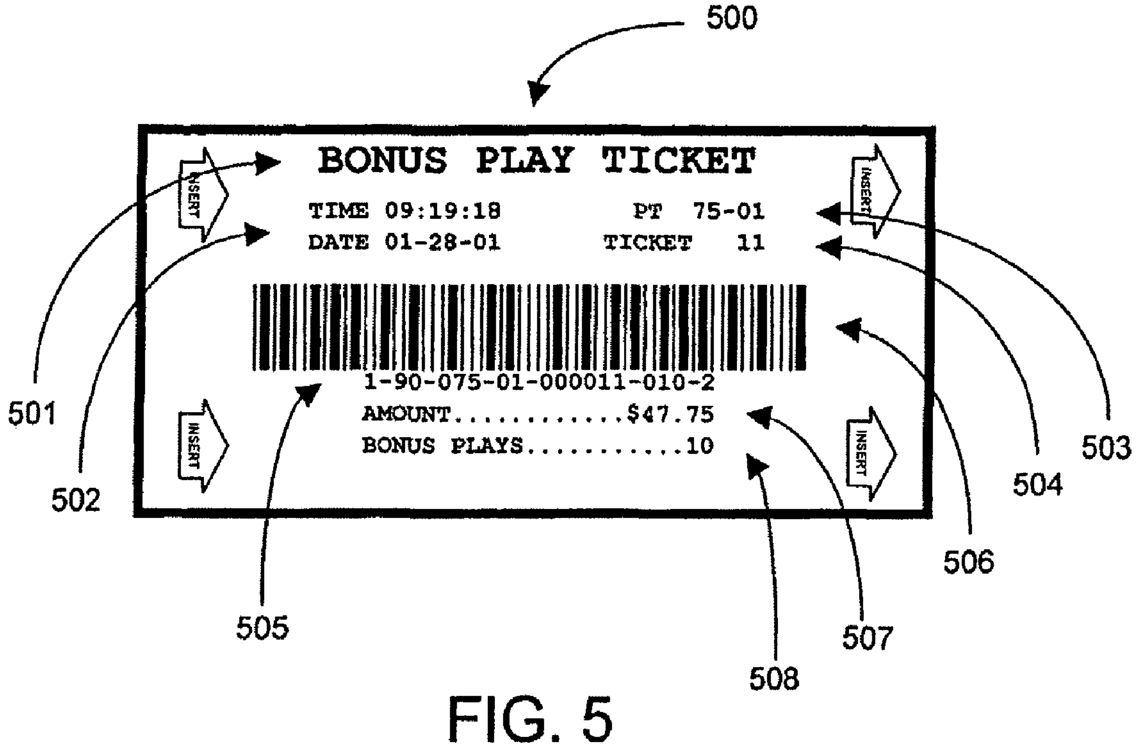
FIG. 5 depicts an example bonus play ticket which enables play on the secondary game station.

An alternative to the above method is to incorporate progressive pays into the payscale as depicted in FIG. 4. In this approach a percentage of regular game play on the primary device and any unwon portions of the predetermined secondary game win amount can be divided up amongst different ranges on the payscale. For example if the player bets 50 credits on the primary game device, 3% of that bet amount can be distributed among the payscale progressive values. If the player hits the triggering event on the primary device and is predetermined to win 500 credits, but because of the player's lack of skill only wins 100 credits, the 400 unwon credits will be distributed among the progressive values on the payscale. Each amount distributed to the payscale progressives is split up with varying percentages.

When the player inserts the secondary game coupon into the secondary play station, the station will select a best case win scenario for the player based on the predetermined win amount from the primary game or game play coupon. As the player plays the skill based game, obstacles will be presented so as to limit the points awarded to the player to reflect the best case scenario selected by the secondary play station. If the player plays optimum skill allowed by the game, the player will win the appropriate progressive value whose base reset amount is equal to the predetermined win amount for the secondary game. If the player does not play with optimum skill, the bonus amount predetermined to be won minus the base progressive reset value for the actual won amount will be distributed to the progressive values on the payscale to be won by another player in the future. Using this method, predetermined win amounts not won by the player due to less than optimal skill performance will be given to players in the future and not kept by the gaming devices. According to this example embodiment, it is important to allow the average player to achieve the best case scenario a majority of the time so as to minimize the actual skill involved.

Jackpot Secondary Game Station

According to another embodiment of the invention, the secondary game station 12 comprises a single "jackpot machine" including a progressive meter or display indicating the current progressive amount. According an example implementation of this jackpot machine, the game play may be configured to have a large "negative hold," thereby providing relatively few but large jackpot prizes.

Each of the primary game devices 16*a* contribute a percentage of the played wager to the jackpot pool, which is accumulated by the jackpot machine 12. The jackpot machine is only enabled for play pursuant to a "special play voucher" dispensed by the game devices 16*a* through 16*n*. The jackpot machine 12 is otherwise not enabled for play directly by players. Once a player obtains a "special play voucher" during the play of game device 16*a* through 16*n*, the play may present the "special play voucher" to the jackpot machine 12 for play of the jackpot machine. According to one embodiment, the jackpot machine 12 may comprise a conventional slot machine (although other game configuration are likewise suitable). The jackpot machine 12 may further define a particular win event (e.g., combination of symbols) which triggers the jackpot win. Upon the jackpot win event, the player is awarded the progressive prize.

Accordingly the present invention provides a diverse and exciting environment, system, arrangement, and method for implementing secondary games with a plurality of primary game devices. The above description which provides specific implementations and details are only provided as illustrative examples of some embodiments of the invention, and should not be considered limiting. Other embodiments and arrangements are contemplated for use with the invention and will be readily apparent to those skilled in the having the benefit of this disclosure.

What is claimed:

1. A method of playing a shared secondary game, the method comprising:

initiating a first game on a first gaming device in response to player input;

determining whether a triggering event for a shared secondary game has occurred during play of the first game;

issuing one or more vouchers at the first gaming device for the shared secondary game, wherein the shared secondary game is presented on a second gaming device that is separate from the first gaming device;

receiving, at the second gaming device, one or more vouchers;

issuing a lockout voucher to a player at the first gaming device after the occurrence of the triggering event during play of the first game;

locking the first gaming device after the issuance of the lockout voucher, wherein game play on the first gaming device is temporarily suspended;

presenting the shared secondary game on the second gaming device in response to player input received at the second gaming device via a player interface located on the secondary gaming device;

receiving the lockout voucher on the first gaming device;

unlocking the first gaming device; and resuming game play on the first gaming device.

2. The method of claim 1, further comprising:

providing a player with an option to play the shared secondary game at a later time; and storing the voucher for the shared secondary game in response to player input requesting to play the shared secondary game at a later time.

3. The method of claim 1, further comprising authenticating the voucher for the secondary game.

4. The method of claim 1, wherein the second gaming device further includes a display for presenting the second game, and wherein the display comprises a wheel having a plurality of awards displayed around the periphery of the wheel and a pointer.

5. The method of claim 4, wherein presenting the shared secondary game on the second gaming device further comprises:

spinning the wheel;

stopping the wheel; and awarding the award corresponding to the award indicated by the pointer.

6. A method of playing a shared secondary game on a second gaming device separate from a first gaming device, the method comprising:

initiating a first game on a first gaming device in response to player input;

determining whether a qualifying event for the shared secondary game has occurred during play of the first game;

issuing a voucher at the first gaming device after the occurrence of the qualifying event, wherein the voucher is used to access play of the shared secondary game on the second gaming device;

issuing a lockout voucher in response to receiving player input to lock the first gaming device after the occurrence of the qualifying event, wherein game play on the first gaming device is temporarily suspended upon issuance of the lockout voucher;

presenting the shared secondary game on the second gaming device after receiving the voucher at the second gaming device; and resuming game play on the first gaming device in response to receipt of the lockout voucher at the first gaming device.

* * * * *